US010334462B2

(12) United States Patent
Ogrinz et al.

(10) Patent No.: US 10,334,462 B2
(45) Date of Patent: Jun. 25, 2019

(54) PREDICTIVE ANALYTICS FOR RESOURCE DEVELOPMENT BASED ON INFORMATION COMMUNICATED FROM INTER-RELATED COMMUNICATION DEVICES

(71) Applicant: BANK OF AMERICA CORPORATION, Charlotte, NC (US)

(72) Inventors: Michael Emil Ogrinz, Easton, CT (US); Jeffery B. Schroeder, Indian Trail, NC (US)

(73) Assignee: Bank of America Corporation, Charlotte, NC (US)

( * ) Notice: Subject to any disclaimer, the term of this patent is extended or adjusted under 35 U.S.C. 154(b) by 120 days.

(21) Appl. No.: 15/191,029

(22) Filed: Jun. 23, 2016

(65) Prior Publication Data

US 2017/0374583 A1    Dec. 28, 2017

(51) Int. Cl.
*H04W 24/08*    (2009.01)
*H04W 4/70*    (2018.01)
*H04L 12/28*    (2006.01)

(52) U.S. Cl.
CPC ......... *H04W 24/08* (2013.01); *H04L 12/2816* (2013.01); *H04L 12/2832* (2013.01); *H04W 4/70* (2018.02); *H04L 2012/2841* (2013.01)

(58) Field of Classification Search
CPC .... G06Q 20/0855; G06Q 20/10; G06Q 20/20; G06Q 20/204; G06Q 20/32; G06Q 20/3221; G06Q 20/3229; G06Q 20/40; G06Q 40/00; G06Q 40/10; G06Q 40/12; H04L 12/2803; H04L 12/66; H04L 12/02; H04L 12/04; H04L 12/06; H04L 63/0428; H04L 63/0823; H04L 63/029; H04L 63/0876; H04L 63/101; H04L 12/2816; H04L 12/2832; H04L 12/08; H04L 2012/2841; H04W 24/08; H04W 36/0016; H04W 4/70; H04W 28/085; H04W 4/38;
(Continued)

(56) References Cited

U.S. PATENT DOCUMENTS 5,377,309 A    12/1994 Sonobe et al.
5,717,923 A    2/1998 Dedrick
5,729,746 A    3/1998 Leonard
(Continued)

FOREIGN PATENT DOCUMENTS

CN        104283967 A    1/2015

OTHER PUBLICATIONS

Friedman, Jack P., Dictionary of Business Terms, 2000, Barron's Educational Series, Inc., 3rd edition, 225.
(Continued)

*Primary Examiner* — Dung B Huynh
(74) *Attorney, Agent, or Firm* — Michael A. Springs; Moore & Van Allen PLLC; James C. Edwards

(57) ABSTRACT

Disclosed are systems for predictive analysis of data received from inter-related communication devices within a distributed communication network (e.g., Internet-of-Things (IoT)), which have been determined to be associated with an entity. The predictive analysis resulting in a determination of future resource needs. Based on the predicted future resource needs, the present invention determines a resource acquisition scheme which serves to accommodate the predicted future resource needs.

20 Claims, 3 Drawing Sheets

(58) Field of Classification Search
CPC ....... H04W 4/80; H04W 84/18; H04W 76/14; H04W 76/23; G06F 2221/2151
See application file for complete search history.

(56) References Cited

U.S. PATENT DOCUMENTS

| | | |
|---|---|---|
| 5,761,648 A | 6/1998 | Golden et al. |
| 5,801,687 A | 9/1998 | Peterson et al. |
| 5,842,185 A | 11/1998 | Chancey et al. |
| 5,848,396 A | 12/1998 | Gerace |
| 5,870,770 A | 2/1999 | Wolfe |
| 5,907,830 A | 5/1999 | Engel et al. |
| 5,911,135 A | 6/1999 | Atkins |
| 5,933,811 A | 8/1999 | Angles et al. |
| 6,006,252 A | 12/1999 | Wolfe |
| 6,009,411 A | 12/1999 | Kepecs |
| 6,009,413 A | 12/1999 | Webber et al. |
| 6,018,627 A | 1/2000 | Iyengar et al. |
| 6,038,393 A | 3/2000 | Iyengar et al. |
| 6,041,309 A | 3/2000 | Laor |
| 6,055,573 A | 4/2000 | Gardenswartz et al. |
| 6,076,069 A | 6/2000 | Laor |
| 6,223,163 B1 | 4/2001 | Van Luchene |
| 6,263,351 B1 | 7/2001 | Wolfe |
| 6,282,567 B1 | 8/2001 | Finch, II et al. |
| 6,292,786 B1 | 9/2001 | Deaton et al. |
| 6,292,813 B1 | 9/2001 | Wolfe |
| 6,317,718 B1 | 11/2001 | Fano |
| 6,321,208 B1 | 11/2001 | Barnett et al. |
| 6,330,543 B1 | 12/2001 | Kepecs |
| 6,332,126 B1 | 12/2001 | Peirce et al. |
| 6,336,099 B1 | 1/2002 | Barnett et al. |
| 6,336,131 B1 | 1/2002 | Wolfe |
| 6,341,305 B2 | 1/2002 | Wolfe |
| 6,349,290 B1 | 2/2002 | Horowitz et al. |
| 6,385,592 B1 | 5/2002 | Angles et al. |
| 6,434,534 B1 | 8/2002 | Walker et al. |
| 6,493,868 B1 | 12/2002 | DaSilva et al. |
| 6,505,168 B1 | 1/2003 | Rothman et al. |
| 6,553,563 B2 | 4/2003 | Ambrose et al. |
| 6,611,814 B1 | 8/2003 | Lee et al. |
| 6,615,184 B1 | 9/2003 | Hicks |
| 6,622,174 B1 | 9/2003 | Ukita et al. |
| 6,678,685 B2 | 1/2004 | McGill et al. |
| 6,782,370 B1 | 8/2004 | Stack |
| 6,829,232 B1 * | 12/2004 | Takeda ............... H04L 12/6418 370/230 |
| 6,851,107 B1 | 2/2005 | Coad et al. |
| 6,853,291 B1 | 2/2005 | Aisa |
| 6,865,429 B1 | 3/2005 | Schneider et al. |
| 6,865,545 B1 | 3/2005 | Epstein et al. |
| 6,906,617 B1 | 6/2005 | Van der Meulen |
| 6,925,444 B1 | 8/2005 | McCollom et al. |
| 6,937,995 B1 | 8/2005 | Kepecs |
| 7,024,374 B1 | 4/2006 | Day et al. |
| 7,043,526 B1 | 5/2006 | Wolfe |
| 7,096,193 B1 | 8/2006 | Beaudoin et al. |
| 7,099,832 B2 | 8/2006 | Walker et al. |
| 7,124,096 B2 | 10/2006 | Dutta et al. |
| 7,127,414 B1 | 10/2006 | Awadallah et al. |
| 7,127,713 B2 | 10/2006 | Davis et al. |
| 7,130,880 B1 | 10/2006 | Burton et al. |
| 7,162,443 B2 | 1/2007 | Shah |
| 7,181,488 B2 | 2/2007 | Martin et al. |
| 7,225,167 B2 | 5/2007 | Hind et al. |
| 7,231,357 B1 | 6/2007 | Shanman et al. |
| 7,236,942 B1 | 6/2007 | Walker et al. |
| 7,246,310 B1 | 7/2007 | Wolfe |
| 7,249,058 B2 | 7/2007 | Kim et al. |
| 7,254,548 B1 | 8/2007 | Tannenbaum |
| 7,257,604 B1 | 8/2007 | Wolfe |
| 7,299,007 B2 | 11/2007 | Eskin |
| 7,302,429 B1 | 11/2007 | Wanker |
| 7,302,638 B1 | 11/2007 | Wolfe |
| 7,315,834 B2 | 1/2008 | Martineau et al. |
| 7,324,965 B2 | 1/2008 | Martineau et al. |
| 7,340,419 B2 | 3/2008 | Walker et al. |
| 7,356,490 B1 | 4/2008 | Jacobi et al. |
| 7,386,477 B2 | 6/2008 | Fano |
| 7,398,248 B2 | 7/2008 | Phillips et al. |
| 7,412,604 B1 | 8/2008 | Doyle |
| 7,433,874 B1 | 10/2008 | Wolfe |
| 7,437,712 B1 | 10/2008 | Brown et al. |
| 7,464,050 B1 | 12/2008 | Deaton et al. |
| 7,472,088 B2 | 12/2008 | Taylor et al. |
| 7,490,056 B2 | 2/2009 | Nash |
| 7,512,551 B2 | 3/2009 | Postrel |
| 7,536,385 B1 | 5/2009 | Wolfe |
| 7,552,080 B1 | 6/2009 | Willard et al. |
| 7,578,435 B2 | 8/2009 | Suk |
| 7,593,862 B2 | 9/2009 | Mankoff |
| 7,599,850 B1 | 10/2009 | Laor |
| 7,606,736 B2 | 10/2009 | Martineau et al. |
| 7,644,390 B2 | 1/2010 | Khodabandehloo et al. |
| 7,694,291 B2 | 4/2010 | Chen et al. |
| 7,752,606 B2 | 7/2010 | Savage |
| 7,761,848 B1 | 7/2010 | Chaffin |
| 7,860,792 B1 | 12/2010 | Magruder et al. |
| 7,925,579 B1 | 4/2011 | Flaxman et al. |
| 8,001,519 B2 | 8/2011 | Conallen et al. |
| 8,042,178 B1 | 10/2011 | Fisher et al. |
| 8,234,194 B2 | 7/2012 | Mele et al. |
| 8,294,747 B1 * | 10/2012 | Weinberg ............... H04N 7/148 348/14.01 |
| 8,301,558 B2 | 10/2012 | Marshall et al. |
| 8,316,237 B1 | 11/2012 | Felsher et al. |
| 8,327,351 B2 | 12/2012 | Paladino et al. |
| 8,392,912 B2 | 3/2013 | Davis et al. |
| 8,442,894 B2 | 5/2013 | Blackhurst et al. |
| 8,495,072 B1 | 7/2013 | Kapoor et al. |
| 8,930,265 B2 | 1/2015 | Blackhurst et al. |
| 8,964,113 B2 | 2/2015 | Kannermark et al. |
| 8,984,113 B2 | 3/2015 | Li et al. |
| 9,009,828 B1 | 4/2015 | Ramsey et al. |
| 9,032,077 B1 * | 5/2015 | Klein ..................... H04L 29/08 370/395.21 |
| 9,043,879 B1 * | 5/2015 | Reeves ................ H04W 12/08 726/4 |
| 9,047,130 B2 | 6/2015 | Chen et al. |
| 9,104,189 B2 | 8/2015 | Berges Gonzalez et al. |
| 9,106,615 B2 | 8/2015 | Grossman |
| 9,338,181 B1 | 5/2016 | Burns et al. |
| 9,411,982 B1 | 8/2016 | Dippenaar et al. |
| 9,693,296 B2 * | 6/2017 | Wan .................. H04L 63/0876 |
| 9,743,272 B1 | 8/2017 | Ogrinz et al. |
| 9,775,131 B2 | 9/2017 | Winand et al. |
| 9,843,624 B1 | 12/2017 | Taaghol et al. |
| 9,874,923 B1 | 1/2018 | Brown et al. |
| 9,946,571 B1 | 4/2018 | Brown et al. |
| 2002/0032626 A1 | 3/2002 | DeWolf et al. |
| 2002/0049624 A1 | 4/2002 | Ravels, Jr. |
| 2002/0052803 A1 | 5/2002 | Amidhozour et al. |
| 2002/0062249 A1 | 5/2002 | Iannacci |
| 2002/0072975 A1 | 6/2002 | Steele et al. |
| 2002/0091571 A1 | 7/2002 | Thomas et al. |
| 2002/0114433 A1 | 8/2002 | Katou et al. |
| 2002/0143564 A1 | 10/2002 | Webb et al. |
| 2002/0190118 A1 | 12/2002 | Davenport et al. |
| 2003/0115367 A1 * | 6/2003 | Ohara ............... H04L 29/12018 709/249 |
| 2003/0135842 A1 | 7/2003 | Frey et al. |
| 2004/0010462 A1 | 1/2004 | Moon et al. |
| 2004/0122736 A1 | 6/2004 | Stock et al. |
| 2004/0192339 A1 | 9/2004 | Wilson et al. |
| 2004/0226995 A1 | 11/2004 | Smith |
| 2004/0230593 A1 | 11/2004 | Rudin et al. |
| 2004/0249768 A1 | 12/2004 | Kontio et al. |
| 2005/0015624 A1 * | 1/2005 | Ginter ..................... G06F 21/55 726/4 |
| 2005/0018686 A1 * | 1/2005 | Igarashi ............... H04W 48/14 370/395.2 |
| 2005/0039053 A1 | 2/2005 | Walia |
| 2005/0075975 A1 | 4/2005 | Rosner et al. |

(56) References Cited

U.S. PATENT DOCUMENTS

| | | |
|---|---|---|
| 2005/0128969 A1* | 6/2005 | Lee ................. H04W 36/32 370/313 |
| 2005/0171845 A1 | 8/2005 | Halfman et al. |
| 2005/0173517 A1 | 8/2005 | Suk et al. |
| 2005/0177437 A1 | 8/2005 | Ferrier |
| 2005/0221842 A1 | 10/2005 | Kaneko et al. |
| 2005/0286079 A1 | 12/2005 | Takagi |
| 2005/0288955 A1 | 12/2005 | Lewiss-Hachmeister |
| 2006/0151598 A1 | 7/2006 | Chen et al. |
| 2006/0217113 A1 | 9/2006 | Rao et al. |
| 2007/0005426 A1 | 1/2007 | Walker et al. |
| 2007/0092114 A1 | 4/2007 | Ritter et al. |
| 2007/0127470 A1 | 6/2007 | Gaedeken et al. |
| 2007/0136418 A1 | 6/2007 | Wolfe |
| 2007/0147320 A1* | 6/2007 | Sattari ................. H04L 47/14 370/338 |
| 2007/0233899 A1* | 10/2007 | Aborn ................ H04W 64/003 709/245 |
| 2007/0240102 A1 | 10/2007 | Bello et al. |
| 2007/0255620 A1 | 11/2007 | Tumminaro et al. |
| 2007/0260532 A1 | 11/2007 | Blake, III |
| 2007/0299677 A1 | 12/2007 | Maertz |
| 2008/0008117 A1* | 1/2008 | Alizadeh-Shabdiz .... G01S 5/02 370/328 |
| 2008/0009268 A1 | 1/2008 | Ramer et al. |
| 2008/0021767 A1 | 1/2008 | Benson et al. |
| 2008/0040417 A1 | 2/2008 | Juncker |
| 2008/0091535 A1* | 4/2008 | Heiser, II .......... G06F 17/30867 705/14.45 |
| 2008/0133336 A1 | 6/2008 | Altman et al. |
| 2008/0162224 A1 | 7/2008 | Coon et al. |
| 2008/0162316 A1 | 7/2008 | Rampell et al. |
| 2008/0192677 A1 | 8/2008 | Abusch-Magder et al. |
| 2008/0221986 A1 | 9/2008 | Soicher et al. |
| 2008/0228600 A1 | 9/2008 | Treyz et al. |
| 2008/0235130 A1 | 9/2008 | Malov et al. |
| 2008/0249936 A1 | 10/2008 | Miller et al. |
| 2008/0249941 A1 | 10/2008 | Cooper |
| 2008/0277465 A1 | 11/2008 | Pletz et al. |
| 2008/0289009 A1* | 11/2008 | Lee ................. H04L 12/2818 726/4 |
| 2008/0301779 A1* | 12/2008 | Garg ................. H04L 63/101 726/4 |
| 2009/0006175 A1 | 1/2009 | Maertz |
| 2009/0043629 A1 | 2/2009 | Price |
| 2009/0094125 A1* | 4/2009 | Killian ................ G06Q 20/0855 705/17 |
| 2009/0122797 A1* | 5/2009 | Thubert ............. H04W 40/246 370/392 |
| 2009/0132366 A1 | 5/2009 | Lam et al. |
| 2009/0132415 A1 | 5/2009 | Davis et al. |
| 2009/0150238 A1 | 6/2009 | Marsh et al. |
| 2009/0170483 A1 | 7/2009 | Barnett et al. |
| 2009/0172728 A1 | 7/2009 | Shkedi et al. |
| 2009/0187436 A1 | 7/2009 | Shoen et al. |
| 2009/0187543 A1 | 7/2009 | Samborn |
| 2009/0271265 A1 | 10/2009 | Lay et al. |
| 2009/0292599 A1 | 11/2009 | Rampell et al. |
| 2009/0292647 A1 | 11/2009 | Porat et al. |
| 2009/0299865 A1 | 12/2009 | Budgen |
| 2009/0313106 A1 | 12/2009 | Taylor et al. |
| 2009/0316701 A1* | 12/2009 | Yoo ................ G01D 5/48 370/392 |
| 2009/0319638 A1 | 12/2009 | Faith et al. |
| 2010/0070525 A1* | 3/2010 | Clark ................ H04L 12/2869 707/769 |
| 2010/0106568 A1 | 4/2010 | Grimes |
| 2010/0131395 A1 | 5/2010 | Allin et al. |
| 2010/0189227 A1 | 7/2010 | Mannar et al. |
| 2010/0250538 A1 | 9/2010 | Richards et al. |
| 2010/0274731 A1 | 10/2010 | Tsitsis |
| 2010/0306763 A1 | 12/2010 | Lambert et al. |
| 2010/0332251 A1 | 12/2010 | Yanak et al. |
| 2011/0040785 A1 | 2/2011 | Steenberg et al. |
| 2011/0087547 A1 | 4/2011 | Amaro et al. |
| 2011/0103392 A1* | 5/2011 | Fan .................. H04L 41/0668 370/401 |
| 2011/0116442 A1* | 5/2011 | Caldwell .............. H04W 12/08 370/328 |
| 2011/0182280 A1 | 7/2011 | Charbit et al. |
| 2011/0191149 A1 | 8/2011 | Blackhurst et al. |
| 2011/0191150 A1 | 8/2011 | Blackhurst et al. |
| 2011/0191160 A1 | 8/2011 | Blackhurst et al. |
| 2011/0191173 A1 | 8/2011 | Blackhurst et al. |
| 2011/0191177 A1 | 8/2011 | Blackhurst et al. |
| 2011/0191180 A1 | 8/2011 | Blackhurst et al. |
| 2011/0191181 A1 | 8/2011 | Blackhurst et al. |
| 2011/0191184 A1 | 8/2011 | Blackhurst et al. |
| 2011/0191238 A1 | 8/2011 | Blackhurst et al. |
| 2011/0238499 A1 | 9/2011 | Blackhurst et al. |
| 2011/0238550 A1* | 9/2011 | Reich ................ G06Q 30/02 705/35 |
| 2011/0270773 A1 | 11/2011 | Siekman et al. |
| 2011/0302201 A1* | 12/2011 | Ogaz ................ G06Q 30/02 707/769 |
| 2012/0016803 A1 | 1/2012 | Tharp |
| 2012/0028635 A1 | 2/2012 | Borg et al. |
| 2012/0030092 A1 | 2/2012 | Marshall et al. |
| 2012/0180024 A1 | 7/2012 | Gonzalez et al. |
| 2012/0190386 A1* | 7/2012 | Anderson ............ G01C 15/04 455/456.3 |
| 2012/0190455 A1* | 7/2012 | Briggs ................ H04L 67/38 463/42 |
| 2012/0290230 A1 | 11/2012 | Berges Gonzalez et al. |
| 2013/0006813 A1 | 1/2013 | Carlin et al. |
| 2013/0046626 A1* | 2/2013 | Grigg ................. G06Q 30/0207 705/14.53 |
| 2013/0079931 A1 | 3/2013 | Wanchoo et al. |
| 2013/0096857 A1 | 4/2013 | Chakradhar |
| 2013/0110621 A1 | 5/2013 | Gupta et al. |
| 2013/0132854 A1 | 5/2013 | Raleigh et al. |
| 2013/0185558 A1* | 7/2013 | Seibert ................ H04L 9/3263 713/168 |
| 2013/0223340 A1* | 8/2013 | Jeong ................ H04W 48/16 370/328 |
| 2013/0260682 A1* | 10/2013 | Suzuki ................ H04W 88/06 455/41.1 |
| 2013/0298242 A1 | 11/2013 | Kumar et al. |
| 2013/0307702 A1 | 11/2013 | Pal et al. |
| 2014/0006529 A1* | 1/2014 | Andreoli-Fang ....... H04L 51/38 709/206 |
| 2014/0047322 A1 | 2/2014 | Kim et al. |
| 2014/0068721 A1* | 3/2014 | Ong ................ H04L 63/107 726/4 |
| 2014/0095666 A1 | 4/2014 | Yampanis |
| 2014/0115324 A1 | 4/2014 | Buer |
| 2014/0136623 A1* | 5/2014 | Kvache ................ H04L 12/2809 709/204 |
| 2014/0226010 A1 | 8/2014 | Molin et al. |
| 2014/0244834 A1 | 8/2014 | Guedalia et al. |
| 2014/0278629 A1 | 9/2014 | Stephenson et al. |
| 2014/0344128 A1* | 11/2014 | Nikankin ............ G06Q 40/00 705/35 |
| 2015/0002271 A1 | 1/2015 | Lee et al. |
| 2015/0013001 A1 | 1/2015 | Lee et al. |
| 2015/0043516 A1* | 2/2015 | Liu ................ H04W 48/08 370/329 |
| 2015/0081837 A1* | 3/2015 | Bernier ................ H04W 8/24 709/217 |
| 2015/0081860 A1* | 3/2015 | Kuehnel ................ H04L 41/0806 709/222 |
| 2015/0094026 A1 | 4/2015 | Martin |
| 2015/0094093 A1* | 4/2015 | Pierce ................ H04W 64/00 455/456.3 |
| 2015/0095478 A1 | 4/2015 | Zuerner |
| 2015/0154012 A1 | 6/2015 | Wolfram |
| 2015/0221039 A1 | 8/2015 | Johansson |
| 2015/0227406 A1 | 8/2015 | Jan et al. |
| 2015/0293574 A1 | 10/2015 | Ehsan et al. |
| 2015/0294553 A1 | 10/2015 | Logan et al. |

(56) References Cited

U.S. PATENT DOCUMENTS

| | | | |
|---|---|---|---|
| 2015/0312348 A1* | 10/2015 | Lustgarten | H04L 67/12 705/14.66 |
| 2015/0327071 A1* | 11/2015 | Sharma | H04W 12/12 726/6 |
| 2015/0358317 A1 | 12/2015 | Deutschman et al. | |
| 2016/0057051 A1* | 2/2016 | McAndrew | H04L 45/245 370/392 |
| 2016/0065628 A1 | 3/2016 | Guo et al. | |
| 2016/0071334 A1 | 3/2016 | Johnson et al. | |
| 2016/0087933 A1 | 3/2016 | Johnson et al. | |
| 2016/0110811 A1 | 4/2016 | Siu et al. | |
| 2016/0132832 A1 | 5/2016 | Pinkovezky et al. | |
| 2016/0164919 A1 | 6/2016 | Satish et al. | |
| 2016/0205599 A1* | 7/2016 | Zhang | H04W 8/02 455/444 |
| 2016/0210450 A1 | 7/2016 | Su | |
| 2016/0217282 A1 | 7/2016 | Vecera et al. | |
| 2016/0232336 A1 | 8/2016 | Pitschel et al. | |
| 2016/0269411 A1 | 9/2016 | Malachi | |
| 2016/0295410 A1 | 10/2016 | Gupta et al. | |
| 2016/0300201 A1 | 10/2016 | Li et al. | |
| 2016/0328282 A1 | 11/2016 | Rogati et al. | |
| 2016/0337869 A1 | 11/2016 | Dai et al. | |
| 2016/0342982 A1* | 11/2016 | Thomas | G06Q 20/027 |
| 2016/0343078 A1 | 11/2016 | Vaidyanathan et al. | |
| 2016/0367415 A1 | 12/2016 | Hayes et al. | |
| 2017/0003960 A1 | 1/2017 | Subramanian et al. | |
| 2017/0004508 A1 | 1/2017 | Mansfield et al. | |
| 2017/0006135 A1 | 1/2017 | Siebel et al. | |
| 2017/0017354 A1 | 1/2017 | Wei | |
| 2017/0041296 A1 | 2/2017 | Ford et al. | |
| 2017/0061442 A1 | 3/2017 | Barlow et al. | |
| 2017/0076408 A1* | 3/2017 | D'Souza | G06Q 40/00 |
| 2017/0122615 A1* | 5/2017 | Tang | F24F 11/30 |
| 2017/0124642 A1* | 5/2017 | Barnett | G06Q 40/02 |
| 2017/0171513 A1 | 6/2017 | Nakamura | |
| 2017/0178186 A1 | 6/2017 | Craft | |
| 2017/0208079 A1 | 7/2017 | Cammarota et al. | |
| 2017/0208139 A1 | 7/2017 | Li et al. | |
| 2017/0228773 A1* | 8/2017 | Takayama | G06Q 30/0254 |
| 2017/0235454 A1* | 8/2017 | Selfridge | G06F 3/0484 715/744 |
| 2017/0244618 A1 | 8/2017 | DeLuca et al. | |
| 2017/0256157 A1* | 9/2017 | Johan | H04L 12/2858 |
| 2017/0278133 A1 | 9/2017 | Corrado et al. | |
| 2017/0280459 A1 | 9/2017 | Ogrinz | |
| 2017/0302669 A1 | 10/2017 | Chen et al. | |
| 2017/0323345 A1* | 11/2017 | Flowers | G06Q 30/0269 |
| 2017/0332228 A1* | 11/2017 | Oda | H04W 8/22 |
| 2017/0352071 A1* | 12/2017 | Carey | G06Q 30/0283 |
| 2017/0353859 A1* | 12/2017 | Idnani | H04W 12/08 |
| 2017/0366422 A1 | 12/2017 | Castinado et al. | |
| 2017/0374583 A1 | 12/2017 | Ogrinz et al. | |
| 2018/0007131 A1 | 1/2018 | Cohn et al. | |
| 2018/0295517 A1* | 10/2018 | Bicket | H04W 4/70 |

OTHER PUBLICATIONS

Guagliardo, Joseph C. et al., "Blockchain: Preparing for Disruption Like Its the 90s"; Mar. 14, 2016, retrieved fr; Mar. 14, 2016, retrieved from http://www.law360.com/articles/77120CVprint?section=ip.

Guagliardo, Joseph C. et al., "Blockchain: Preparing for Disruption Like Its the 90s"; Mar. 14, 2016, retrieved from http://www.law360.com/articles/77120CVprint?section=ip.

International Preliminary Report on Patentability (IPRP) dated Jul. 31, 2012 for International Application No. PCT/US2011/022765.

International Search Report and the Written Opinion of the International Searching Authority dated Mar. 25, 2011 for International Application No. PCT/US11/22781.

International Search Report and the Written Opinion of the International Searching Authority dated Mar. 25, 2011 for International Application No. PCT/US11/22783.

International Search Report and the Written Opinion of the International Searching Authority dated Mar. 28, 2011 for International Application No. PCT/US11/22771.

International Search Report and the Written Opinion of the International Searching Authority dated Mar. 29, 2011 for International Application No. PCT/US11/22779.

International Search Report and the Written Opinion of the International Searching Authority dated Mar. 29, 2011 for International Application No. PCT/US11/22785.

International Search Report and the Written Opinion of the International Searching Authority dated Apr. 8, 2011 for International Application No. PCT/US11/22765.

* cited by examiner

PREDICTIVE ANALYTICS FOR RESOURCE DEVELOPMENT BASED ON INFORMATION COMMUNICATED FROM INTER-RELATED COMMUNICATION DEVICES

FIELD OF THE INVENTION

The present invention relates to data communication amongst a system of inter-related communication devices in a distributed communication network and, more specifically, determining which of the inter-related communication devices are associated with an entity, receiving data associated with the communication devices, and performing predictive analysis on the data to predict future resource needs and, subsequently, determine resource acquisition schemes.

BACKGROUND

Systems for providing communications between and amongst devices are known where inter-related communication devices, often referred to as smart devices, may include communications modules, processors and applications that allow the devices to communicate with one another, and with other devices and/or systems, over a network. Such systems allow the devices to collect and exchange data and are commonly referred to as the Internet-of-Things (IoT).

SUMMARY

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing apparatus, systems, computer program products, for predictive analysis of data received from inter-related communication devices, within a distributed communication network (e.g., Internet-of-Things (IoT)), which are determined to be associated with an entity. The predictive analysis resulting in a determination of future resource needs. Based on the predicted future resource needs, the present invention determines a resource acquisition scheme which serves to accommodate the predicted future resource needs.

In specific embodiments of the invention, the inter-related communication devices are determined to be associated with the entity by one of (i) accessing a trusted device list that associates known/authenticated communication devices with users, (ii) determining and accessing a gateway address associated with the entity, and/or (iii) determining and accessing a short-range wireless network (WI-FI® or the like) associated with the entity.

In other embodiments of the invention, data received from inter-related communication devices may identify the devices, such as type, brand, and the like. In such embodiments of the invention, analyzing the data may include analyzing the data to predict future entity resource needs based on the identity of the devices or, in some embodiments, analysis may include determining an entity level or classification for the entity based on the identity of the devices and predicting future entity resource needs based on the entity level/classification.

A system for predictive analysis for resource management defines first embodiments of the invention. The system includes a computer platform having a memory, a processor in communication with the memory, and a network communication device in communication with the processor. The system further includes a resource management module that is stored in the memory and executable by the processor. The resource management module is configured for communicating with a plurality of inter-related communication devices across a distributed communication network. Each of the inter-related communication devices include at least one sensor that captures data and communicates the data via the distributed communication network, in this regard the inter-related communication devices may be referred to as Internet-of-Things (Iot) devices. The resource management module is further configured for determining that one or more of the inter-related communication devices are associated with an entity. Such a determination may be made by (i) accessing a trusted device list that associates one or more of the inter-related communication devices with the entity, (ii) determining a gateway address associated with the entity, or (iii) determining a short-range wireless network associated with the entity.

The resource management module is further configured for, in response to determining that inter-related communication devices are associated with the entity, receiving, at least a portion of, the data communicated from the one or more of the plurality of devices and analyzing the data to predict future entity resource needs. The module is further configured for determining a resource acquisition scheme that accommodates the future entity resource needs.

In specific embodiments of the system, the data that is received from the inter-related communication devices includes data that identifies the devices (e.g., type, brand, model or the like). In such embodiments of the invention, the resource management module may be further configured for analyzing the data to predict future entity resource needs based on the identity of the inter-related communication devices. In other specific embodiments of the system, the resource management module may be further configured for analyzing the data to determine an entity level or classification based on the identity of the inter-related communication devices, and based on the entity level/classification, predict the future entity resource needs.

In further specific embodiments of the system, the data that is received from the inter-related communication devices includes performance data associated with the plurality of devices. In such embodiments of the system, the resource management module may be further configured for analyzing the data to determine at least one of (i) a current state of one or more of the inter-related communication devices, or (ii) a predicted life of one or more of the inter-related communication devices. In such embodiments of the system, the resource management module is further configured for determining the resource acquisition scheme for the future entity resource needs based on the current state and/or the predicted life of the inter-related communication devices.

In other specific embodiments of the system, the data that is received from the inter-related communication devices includes consumption data associated with consumable sub-devices/sub-components associated with the inter-related communication devices. In such embodiments of the system, the resource management module may be further configured for analyzing the consumption data to predict future entity resource needs. In still further embodiments of the system, the data that is received from the inter-related communication devices includes procurement data associated with items or services procured via the inter-related communication devices. In such embodiments of the system, the resource management module may be further configured for analyzing the procurement data to predict future entity resource needs.

In specific embodiments of the system, the resource management module is configured for determining, in real-time or near real-time, the resource acquisition scheme that accommodates the predicted future entity resource needs, and, in response to determining the resource acquisition scheme, electronically communicating the resource acquisition scheme to the entity.

In still further specific embodiments of the system, the resource management module is further configured for analyzing the data to predict future entity resource needs, in which the future entity resource needs are further defined as financial resources needed by the entity in the future. In such embodiments of the system, the resource management module is further configured for determining the resource acquisition scheme that accommodates the future entity resource needs, in which the resource acquisition scheme are one or more offers for financial products that serve to accommodate the financial resources needed by the entity in the future.

A method for predictive analysis for resource management defines second embodiments of the invention. The method includes communicating with a plurality of inter-related communication devices across a distributed communication network. Each of the inter-related communication devices include at least one sensor that captures data and communicates the data via the distributed communication network. The method further includes determining, by a computing device processor, that one or more of the inter-related communication devices are associated with an entity based on at least one of (i) accessing a trusted device list that associates one or more of the inter-related communication devices with the entity (ii) determining a gateway address associated with the entity, or (iii) determining a short-range wireless network associated with the entity.

The method additionally includes, in response to determining that one or more of the inter-related communication devices are associated with the entity, receiving, by a computing device processor, at least a portion of the data associated with the one or more of the plurality of inter-related communication devices and analyzing, by a computing device processor, the data to predict future entity resource needs. The method also includes determining, by a computing device processor, a resource acquisition scheme that accommodates the future entity resource needs.

A computer program product for predictive analysis for resource management including a non-transitory computer-readable storage medium defines third embodiments of the invention. The computer-readable storage medium includes computer-executable instructions for communicating with a plurality of inter-related communication devices across a distributed communication network. Each of the inter-related communication devices include at least one sensor that captures data and communicates the data via the distributed communication network. The instructions further include instructions for determining that one or more of the inter-related communication devices are associated with an entity based on at least one of (i) accessing a trusted device list that associates one or more of the inter-related communication devices with the entity, (ii) determining a gateway address associated with the entity, or (iii) determining a short-range wireless network associated with the entity. In addition, the instructions include instructions for, in response to determining that one or more of the inter-related communication devices are associated with the entity, receiving at least a portion of the data associated with the one or more of the plurality of devices and instructions for analyzing the data to predict future entity resource needs. Moreover, the instructions include instructions for determining a resource acquisition scheme that accommodates the future entity resource needs.

Thus, systems, apparatus, methods, and computer program products herein described in detail below provide for predictive analysis of data received from inter-related communication devices, within a distributed communication network (e.g., Internet-of-Things (IoT)), which are determined to be associated with an entity. The predictive analysis resulting in a determination of future resource needs. Based on the predicted future resource needs, the present invention determines a resource acquisition scheme which serves to accommodate the predicted future resource needs.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
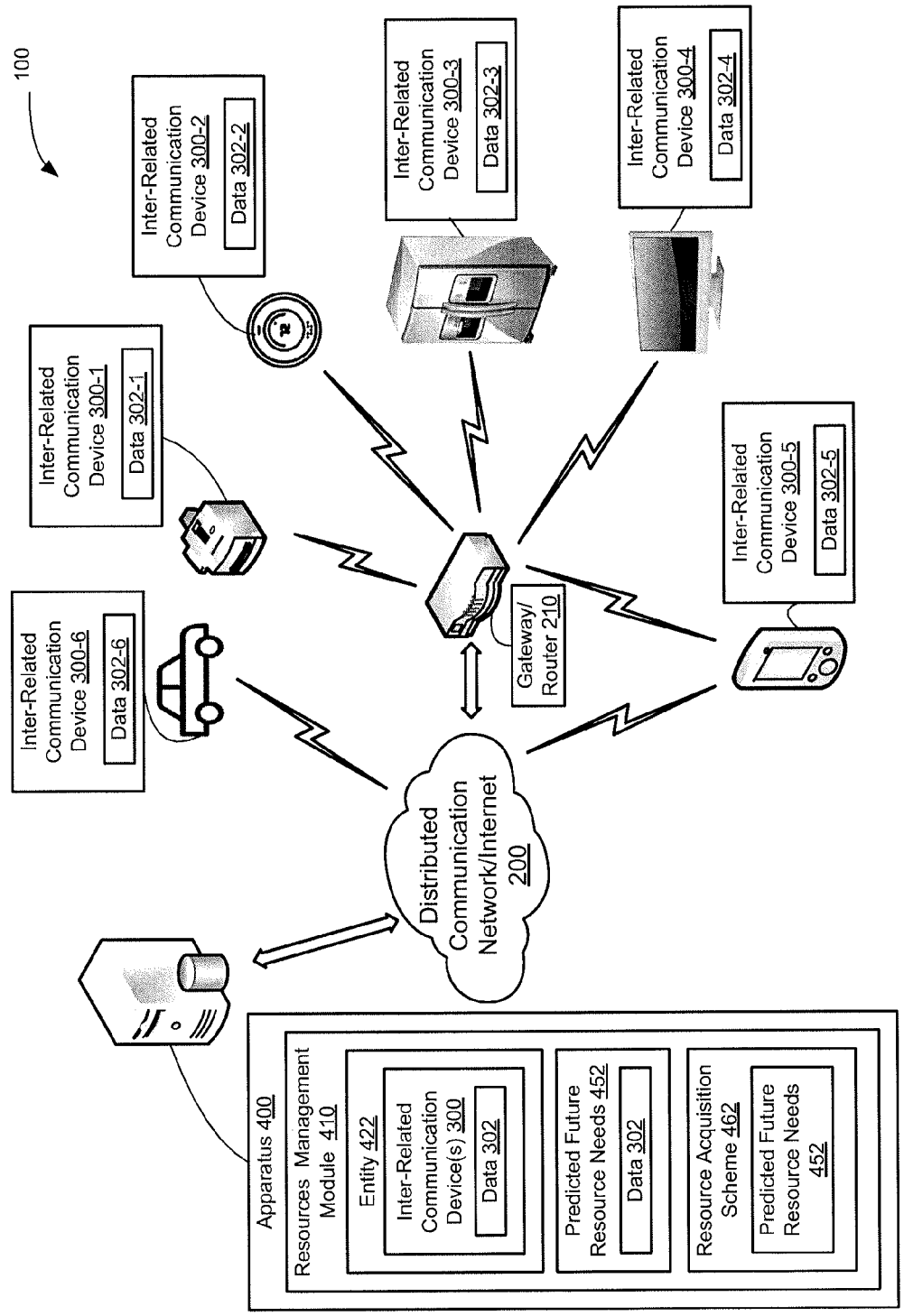
Figure 2:
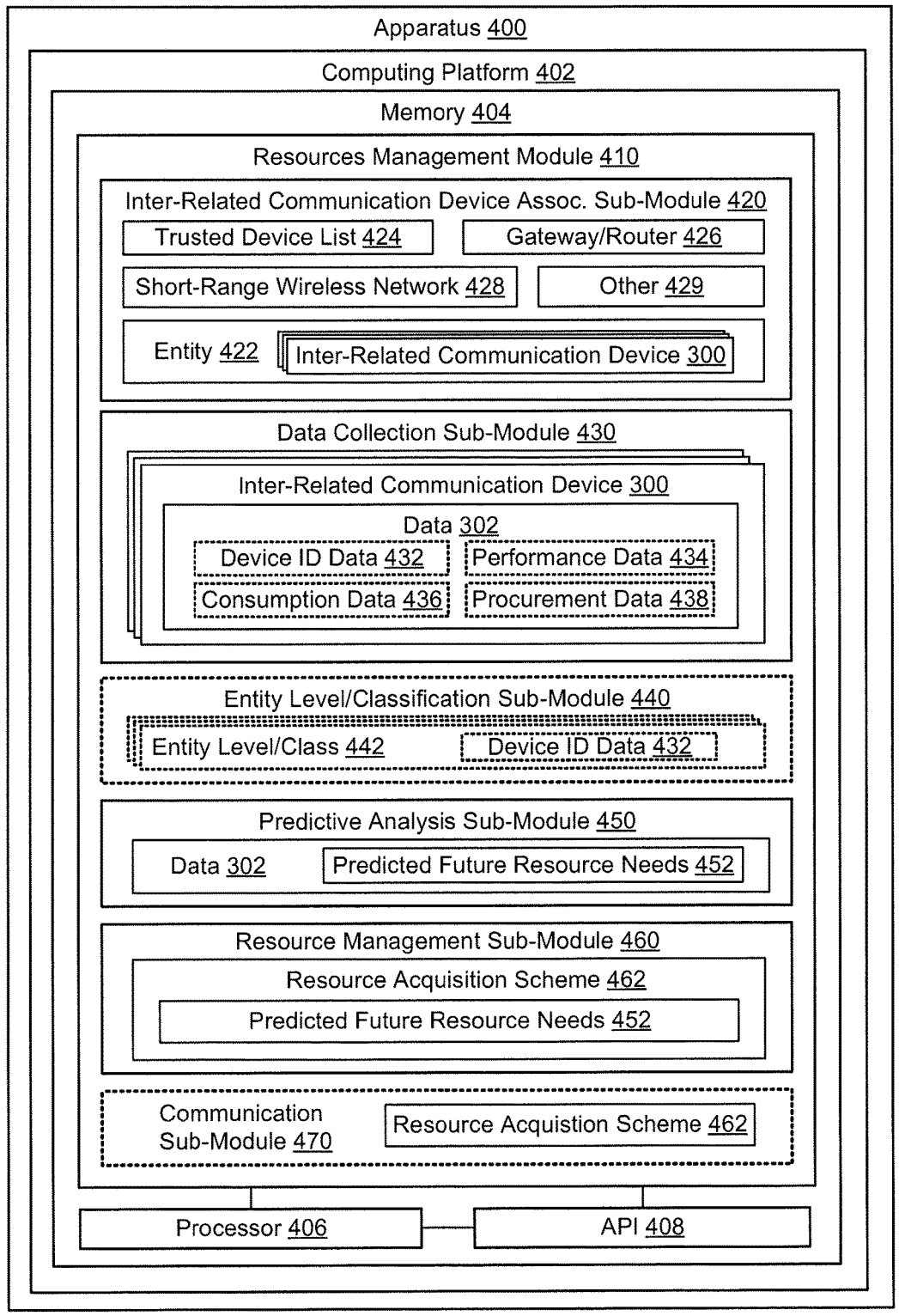
Figure 3:
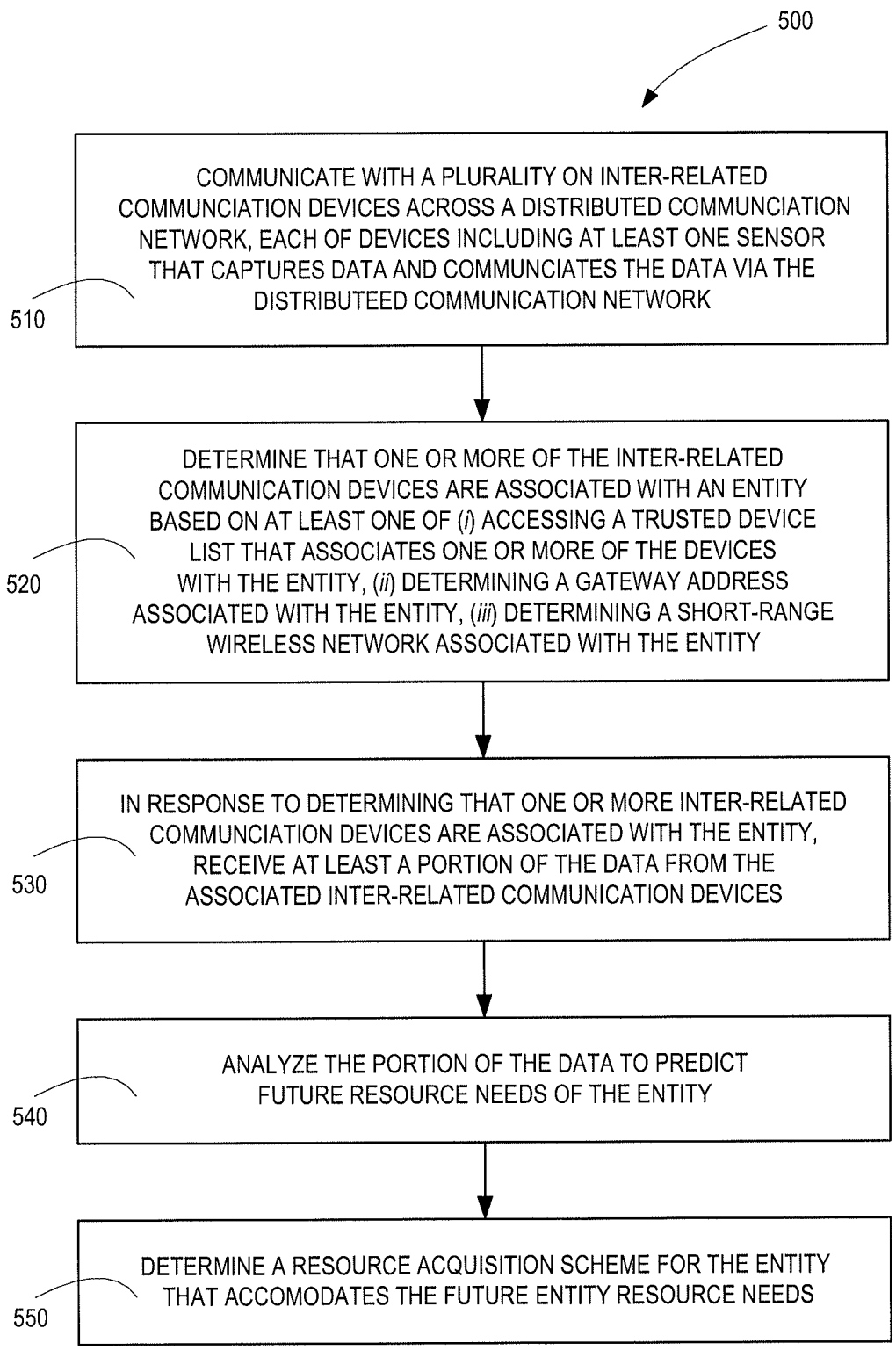

Having thus described embodiments of the invention in general terms, reference will now be made the accompanying drawings, wherein:

FIG. 1 provides a schematic diagram of an exemplary system for predictive analysis of data from inter-related communication devices determined to be associated with an entity for the purpose of resource management, in accordance with embodiments of the present invention;

FIG. 2 provides a block diagram of an apparatus for predictive analysis of data from inter-related communication devices determined to be associated with an entity for the purpose of resource management, in accordance with embodiments of the present invention; and FIG. 3 provides a flow diagram of a method system for predictive analysis of data from inter-related communication devices determined to be associated with an entity for the purpose of resource management, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++ or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatuses (the term "apparatus" including systems and computer program products). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

In accordance with embodiments of the invention, the term "inter-related communication devices" refers to any "smart device" (i.e., a device or apparatus capable of communicating with and transmitting information or data to and/or receiving information or data from other devices, systems or apparatus over a network, such as the Internet or the like). The inter-related communication device may be for example, but not limited to, a machine such as an automobile, tractor trailer, airplane, manufacturing device, warehouse devices, material handling system, conveyor system, robotics or the like; appliances such as refrigerators, washer/dryers, dish washers, or the like; home entertainment devices or systems such as set top boxes, gaming systems, internet televisions, or the like; home or building systems such as home security systems, utility systems such as electrical, water, plumbing systems and apparatuses such as electric meters, water meters, hot water heaters, gas meters or the like; and personal devices such as mobile telephones, laptops, wearable devices such as internet capable fitness devices, watches, glasses or the like. The list of inter-related communication devices provided herein is not exhaustive such that the inter-related communication device may be any device that includes a communication interface or module, software and/or hardware that allow the device to communicate data and/or information related to the device with other devices and/or systems over a network.

Further, in accordance with embodiments of the invention an "entity" as used herein refers to an individual or a group (i.e., association, business or the like) that has control over, possesses or otherwise owns the inter-related communication devices. In this regard, the entity may possess the inter-related devices within their domicile or their place of association/business. Further, personal devices, such as mobile telephones, laptops, wearable devices or the like may be associated with the entity, such as an individual or one of the individuals associated with the group. Additionally, in accordance with embodiments of the invention a "user" as used herein refers to the group that executes the resource management module. In specific embodiments of the invention, a user may be a financial institution or another entity that provides financial product offers to individual or groups (i.e., businesses or the like).

According to embodiments of the invention described herein, various systems, apparatus, methods, and computer program products are herein described for predictive analysis of data received from inter-related communication devices disposed within a distributed communication network (e.g., Internet-of-Things (IoT)), which are determined to be associated with an entity. The predictive analysis results in a determination of future resource needs. Based on the predicted future resource needs, the present invention determines a resource acquisition scheme which serves to accommodate the predicted future resource needs.

In specific embodiments of the invention, the inter-related communication devices are determined to be associated with the entity by one of (i) accessing a trusted device list that associates known/authenticated communication devices with users, (ii) determining/accessing a gateway address associated with the entity, or (iii) determining/accessing a short-range wireless network (WI-FI® or the like) associated with the entity.

In other embodiments of the invention, the data received from inter-related communication devices may identify the devices, in terms of type, brand, model and the like. In such embodiments analyzing the data may include analyzing the data to predict future entity resource needs based on the identity of the devices or, in some embodiments, analysis may include determining an entity level or classification for the entity based on the identity of the devices and predicting future entity resource needs based on the entity level/ classification.

Referring to FIG. 1, a schematic diagram is provided of a system 100 for predictive analysis for resource management, in accordance with embodiments of the present invention. The system 100 is implemented in a distributed communication environment via computing network 200, which typically comprises the Internet and may include various sub-nets and/or intranets. System 100 includes apparatus 400 which stores resources management module 410, which is configured to perform predictive analysis on data 302 received from the inter-related communication devices 300 that have been determined to be associated with an entity 422 to predict future resource needs 452 of the entity. Based on the predicted future resource needs 452, the resources management module 410 determines, and provide to the entity 422, a resource acquisition scheme 462.

As previously discussed, the inter-related communication devices 300 may be devices located within an entity's domicile/residence or place of business, which connect to the distributed communication network 200 via a gateway device 210, otherwise referred to herein as a router device. The connection between the gateway/router 210 and the inter-related communication devices 300 1-5 may be wireless, as shown in FIG. 1, or in other instances the connection may be a physical/wired connection. The data 302 that is communicated is generally data associated with the inter-related communication device 300, such as device identity information (e.g., type of device, brand, model and the like), performance data, consumption data (i.e., useful life remaining of sub-devices, sub-components which are readily replaceable), procurement data (i.e., transaction data associated with those inter-related communication devices 300 that conduct and/or authorize automated or non-automated transactions) and the like.

In the illustrated embodiment of FIG. 1, the inter-related communication devices 300 include a multipurpose printer 300-1, a smart thermostat 300-2, a refrigerator 300-3, a television 300-4 and a mobile device/smart telephone 300-5, all of which may reside within an entity's residence and communicate with the gateway/router 210 as the entry point to the distributed communication network 200. Additionally, the mobile device/smart telephone 300-5 and a vehicle 300-6 may be configured to communicate with the distributed communication network 200 directly (i.e., absent the gateway/router 210), such as through a cellular network (not shown in FIG. 1) or the like.

Referring to FIG. 2 a block diagram is presented of the apparatus 400, which is configured for predictive analysis for resource management, in accordance with embodiments of the present invention. In addition to providing greater detail, FIG. 2 highlights various alternate embodiments of the invention. The apparatus 400 may include one or more of any type of computing device, such as one or more servers, personal computers or the like. The present apparatus and methods can accordingly be performed on any form of one or more computing devices.

The apparatus 400 includes a computing platform 402 that can receive and execute algorithms, such as routines, and applications. Computing platform 402 includes memory 404, which may comprise volatile and non-volatile memory, such as read-only and/or random-access memory (RAM and ROM), EPROM, EEPROM, flash cards, or any memory common to computer platforms. Further, memory 404 may include one or more flash memory cells, or may be any secondary or tertiary storage device, such as magnetic media, optical media, tape, or soft or hard disk. Moreover, memory 404 may comprise cloud storage, such as provided by a cloud storage service and/or a cloud connection service.

Further, computing platform 402 also includes processor 406, which may be an application-specific integrated circuit ("ASIC"), or other chipset, processor, logic circuit, or other data processing device. Processor 406 or other processor such as ASIC may execute an application programming interface ("API") 408 that interfaces with any resident programs, such as resources management module 410 and routines, sub-modules associated therewith or the like stored in the memory 404 of the apparatus 400.

Processor 406 includes various processing subsystems (not shown in FIG. 2) embodied in hardware, firmware, software, and combinations thereof, that enable the functionality of apparatus 400 and the operability of the apparatus on a network. For example, processing subsystems allow for initiating and maintaining communications and exchanging data with other networked devices, such as those inter-related communication devices shown in FIG. 1. For the disclosed aspects, processing subsystems of processor 406 may include any subsystem used in conjunction with resources management module 410 and related algorithms, sub-algorithms, modules, sub-modules thereof.

Computer platform 402 may additionally include communications module (not shown in FIG. 2) embodied in hardware, firmware, software, and combinations thereof, that enables communications among the various components of the apparatus 400, as well as between the other networked devices. Thus, communication module may include the requisite hardware, firmware, software and/or combinations thereof for establishing and maintaining a network communication connection.

The memory 404 of apparatus 400 stores resources management module 410 which is configured to perform predictive analysis on data 302 received from inter-related communication devices 300 that are determined to be associated with an entity 422 to predict future resource needs 452 of the entity 422 and, based on the predicted future resource needs, determine, and provide to the entity 422, a resource acquisition scheme 462. As shown in FIG. 1, the apparatus 400 is in communication with the inter-related communication devices 300, such that resource management module 410 is configured for receiving data 302 communicated from the inter-related communication devices 300.

Resource management module 410 includes inter-related computing device association sub-module 420 that is configured to determine which of the inter-related communication devices 300 are associated with an entity 422. It should be noted that while FIG. 2 depicts inter-related computing device association sub-module 420 as being included within resource management module 410, in other embodiments of the invention, inter-related computing device association sub-module 420 or the functionality provided by inter-related computing device association sub-module 420 may exist external from the resource management module 410.

In specific embodiments of the invention, the entity 422 grants the user (i.e., the party executing or controlling the resource management module 410) rights in executing the resource management module 410 for their benefit. In other words, the entity 422 may provide the user authorization to predict their future resource needs 452 and to determine and provide them with associated resource acquisition scheme(s) 462. In such embodiments of the invention, the user may acquire, over time, a list 424 of trusted inter-related communication devices associated with the entity 422, which the entity 422 has used to communicate with the user (e.g., personal computers used to access the user's website, mobile devices used to call/contact the user or used to execute a user's mobile application or the like). Further, the entity 422 may grant the user general rights over the all data communicated from the inter-related communication devices 300 included on the trusted device list 424, specific rights over entity-specified data communicated from the devices 300 included on the trusted device list 424 and/or specific rights for the resource management module 400 to receive data (i.e., all data, or entity-specified data) from the inter-related communication devices 300 included on the trusted device list 424.

However, the trusted device list 424 may be limited to devices which the entity 422 uses to communicate with the user and, as such may not include all of the inter-related communication devices 300 associated with the entity 422. Thus, in other embodiments of the invention, the inter-related computing device association sub-module 420 may be configured to determine one or more gateways/routers 426 associated with the entity 422 and/or one or more short-range wireless networks 428 associated with the entity 422. Such determination may occur based on network communication received by the user from the entity 422 (e.g., user website communication, user mobile application communication and the like). For example, the entity 422 may communicate with the user via a router/gateway 426 and/or a short-range wireless network 428 at the entity's domicile or place of business. The gateway/router 426 and/or short-range wireless network 428 may be identified/determined based on one or more of a router/gateway identification number, Internet Protocol (IP) address, subnet mask identification number, domain name or the like.

In additional embodiments of the invention, the entity 422 may identify one or more of gateways/routers 426 and/or one or more short-range wireless networks 428 that are associated with the entity 422. In other words, the entity may provide the inter-related computing device association sub-module 420 with identification information (e.g., router/gateway identification number, Internet Protocol (IP) address, subnet mask identification number, domain name or the like) associated with the gateways/routers 426 and/or one or more short-range wireless networks 428 and provide the user access to all or a specified portion of the data 302 that the entity transmits via the gateway(s)/router(s) 426 and/or short-range wireless network(s) 428. In this regard, the inter-related computing device association sub-module 420 may be configured to "ping" or otherwise communicate with the gateway(s)/router(s) 426 and/or short-range wireless network(s) 428 to, at a minimum, determine which devices 300 are connected (i.e., transmitting data) to the distributed communication network and, in some embodiments, based on entity 422 authorization, receive or otherwise access the data 302 that is being transmitted from the inter-related communication devices 300 via the gateway(s)/router(s) 426 and/or short-range wireless network(s) 428. Having access to the gateway(s)/router(s) 426 and/or short-range wireless network(s) 428 not only provides the resource management module 410 with data being transmitted from inter-related communication devices 300 that would not otherwise communicate or transmit data to the entity 422, but also provides for identification and receipt of data from any new inter-related communication devices 300 that an entity 422 acquires or otherwise becomes associated with.

In other embodiments of the invention, the inter-related communication device association sub-module 420 may implement other 429 means to determine which inter-related communication device 300 are associated with the entity 422. In other instances, the entity 422 may configure the device settings of one or more of the inter-related communication devices 300 associated with the entity 422 to transmit data to the user/resource management module 410, thus, obviating the need for the inter-related communication device association sub-module 420 to determine that those inter-related communication devices 300 are associated with the entity 422.

The resources management module 410 further includes data collection sub-module 430 that is configured, in response to identifying/determining which inter-related communication devices 300 are associated with the entity 422, receive data 302 from the inter-related communication devices 300 determined to be associated with the entity 422. In specific embodiments of the invention, the data collection sub-module 430 may be configured to receive the data 302 on an ongoing continuous basis based on the unscheduled or scheduled data transmissions transmitted from the inter-connected communication devices 300. In other embodiments of the invention, the data collection sub-module 430 may be configured to "ping" or otherwise call-out the inter-connected communication devices 300 (and/or the gateway/routers) on an on-demand dynamic basis or a scheduled basis to retrieve specified data from the inter-related communication devices 300 or to access transmission logs stored in the inter-related communication devices 300 or elsewhere in the network to identify and/or retrieve data that has been transmitted.

The data 302 that is received/collected by the data collection sub-module 430 may comprise any data conventionally transmitted by inter-related communications devices 300 that is relevant to subsequent prediction analysis for the purpose of determining future resource needs 452 of the entity 422. In specific embodiments of the invention, the data 302 may include device identification data 432 that identifies the inter-related communications device 300 in terms of device type, device brand, device model or the like. In other embodiments of the invention, the data 302 may include performance data 434 that indicates the performance statistics/attributes associated with the inter-related communications devices 300 and/or sub-components of the inter-related communications device 300. Further, in other embodiments of the invention, the data 302 may include consumption data 436 that indicates a level of the useful life used and/or remaining in a consumable (i.e., replaceable) sub-component/sub-device of the inter-related communications device 300. In still further embodiments of the invention, the data 302 may include procurement data 438 that indicates specifics related to procurements (e.g., transactions for goods or services) conducted by or for the inter-related communications devices 300. The procurements may be related to the inter-related communications device 300 (e.g., procurements for consumable/exhaustible sub-component/sub-device of or related to the inter-related communications device 300), or procurements may be unrelated to the inter-related communications device 300 (e.g., general procurements for any good(s) or service(s) conducted through a personal device, such as a mobile telephone or the like). In addition, any other data 300 transmitted from the inter-related communication devices 300 that is relevant to predicting future resource needs of the entity 422 may be received and utilized by the resource management module 410.

In optional embodiments of the invention, in which the resource management module 410 relies on device identification data 432 to predict future resource needs 452 of the entity 422, the resource management module 410 may further include an entity level/classification sub-module 440 that is configured for determining an entity level/classification 442 for the entity 422 based on the device identification data 432. For example, the types, brands and/or models of inter-related communication devices 300 associated with an entity 422 may indicate an income level, wealth level, receipts/profit level associated with the entity 422, which may equate to a specific entity level/classification 442 for purposes of subsequent determination of predicted future resource needs 452.

Resource management module 410 additionally includes predictive analysis sub-module 450 that is configured for determining predicted future resource needs 452 of an entity 422 based, at least, on the data 302 received from the inter-related communication devices 300 associated with the entity 422. In specific embodiments of the invention, future resource needs may be further defined as future financial resource needs. Predictive analysis sub-module 450 may utilize logic and/or algorithms, for example, heuristic algorithms/logic or the like to predict future resource needs 422 for an entity 422 based on the data 302 received from the inter-related communication devices 300. In specific embodiments of the invention, in which the user has access to other data related to the entity, the user may incorporate other data, besides the data received from the inter-related communication devices 300, into the logical determination of the predicted future resource needs 422. For example, in those embodiments of the invention in which the user is a financial institution and the entity is a customer of the financial institution, the financial institution may rely on customer profile information, and/or customer transaction history data to determine the predicted future resource needs 452 of the entity 422.

In specific embodiments of the invention, in which the data 302 includes device identification data 432, the device identification data 432 may be used to predict future resource needs 452. For example, if the device identification data 432 indicates that the entity is associated with specific high-end/luxury devices, e.g., state-of-the art television, luxury vehicle or the like, the predictive analysis sub-module 450 may be configured to determine that the entity 422 has increased predicted future resource needs, i.e., increased predicted future finance needs 452 based on a propensity for high-end/luxury devices/items. In addition, if the device identification data 432 indicates a model name/number or model year, the predictive analysis sub-module 450 may be configured to determine that the entity 422 has imminent predicted future resource needs if the model or model year indicates that the device/vehicle is early model or early model year.

Additionally, in those embodiments of the invention in which the resource management module 410 includes an entity level/classification sub-module 440, the entity level classification 442 assigned to the entity 422 may define the predicted future resource needs 452 of the entity 422. For example, a higher entity level/classification 442 may equate to a higher/increased predicted future resource needs 452 or the like.

In other specific embodiments of the invention, in which the data 302 includes performance data 434, the performance data 434 may be used to predict future resource needs 452. Specifically, the performance data 452 may be analyzed to determine a current state of an associated inter-related communication device 300 and/or a predicted life for an associated inter-related communication device 300 (i.e., how much longer the device can be used). Thus, for example, if the current state and/or the predicted life indicates that the inter-related communication device 300 will need to be replaced in the near future or indicates a specific time in the future in which replacement will need to occur, the determination of the predicted future resource needs 452 may take into account such data; thereby increasing predicted imminent future resource needs 452 for devices requiring near future replacement and/or accurately scheduling predicted future resource needs 452 to accommodate the specific predicted time in the future in which replacement will need to occur.

In still further specific embodiments of the invention, in which the data 302 includes consumption data 436, the consumption data 436 may be used to predict future resource needs 452. Specifically, the consumption data 436 may be analyzed to determine that a consumable/exhaustible sub-device/sub-component of the inter-related communication device 300 needs replacement or prediction of the time in the future at which the sub-device/sub-component will need replacement. Thus, for example, if the sub-device/sub-component is the air conditioning (A/C) unit or heating unit associated with a smart thermostat, the consumption data 436 may indicate that the A/C or heating unit needs replacing (i.e., has exhausted its useful life) or may indicate a time period in the future at which the A/C or heating unit will need replacement. In such embodiments, the predictive analysis sub-module 450 may take such information into account and increase predicted imminent future resource needs 452 for devices requiring near future replacement and/or accurately scheduling predicted future resource needs 452 to accommodate the specific predicted time in the future in which replacement will need to occur.

Moreover, in other specific embodiments of the invention, in which the data 302 includes procurement data 438 (i.e., transactions conducted by or associated with the inter-related communication devices 300), the procurement data 438 may be used to predict future resource needs 452. Specifically, the predictive analysis sub-module 450 may take into account such information in predicting what other procurements that the entity will make in the future; such as, goods/services that are related to a previous procurement, sub-devices/sub-components of the goods/services that will require replacement in the future, the known useful life of the goods/services in the procurement and the like. As a result, the predictive analysis sub-module 450 may increase (or decrease) predicted future resource needs 452 based on the procurement data.

In addition, resource management module 410 includes resource management sub-module 460 that is configured to determine one or more resource allocation schemes 462 based on the predicted future resource needs 452. In specific embodiments of the invention, the resource allocation schemes 462 comprise specific offers for financial products and/or services that are uniquely tailored for the entity 422 based on the predicted future resource needs 452. In this regard, the resource allocation schemes 462 may be entity-specific as to types of financial products offered to the entity 422 (e.g., short term loan, standard loan, mortgage, re-financing of existing loan or the like) based on the predicted future resource needs 452 of the entity 422. In other embodiments of the invention, the resource allocation schemes 462 may be entity-specific (based on the predicted future resource 452 needs of the entity 442) as to other attributes related to the financial products offered (e.g., amounts, costs, rates and the like) or the timing for making the offers to the entity 422.

Additionally, resource management module 410 may, in optional embodiments, include communication sub-module 470 that is configured for electronically communicating the resource allocation scheme(s) 462 to the entity 422. In specific embodiments of the invention, the determination of the predicted future resource needs 452 and the resource acquisition scheme 462 and the generation and communication of the resource acquisition scheme may occur dynamically, in real-time or near real-time, in relation to receipt of the data 302 by the resource management module 410 from the inter-related communication devices 300.

Referring to FIG. 3 a flow diagram is depicted of a method 500 for predictive analysis of data received from inter-related communication device for the purpose of resource management, in accordance with embodiments of the present invention. At Event 510, a plurality of inter-related communication devices disposed across a disparate communication network are in communication with a resource management module. In accordance with embodiments of the invention, each of the inter-related communication devices include at least one sensor that captures data and communicates the data via the disparate communication network. In this regard, the inter-related communication devices may be referred to as Internet-of-Things (IoT) devices.

At Event 510, a determination is made that one or more of the inter-related communication devices are associated with an entity (i.e., an individual, group of individuals, organization, business or the like that has a desire to have resources managed). The determination is made based on at least on of (i) accessing a trusted device list that associated one or more known authenticated devices with the entity, (ii) determining a gateway/router device/address associated with the entity, and/or (iii) determining a short-range wireless network associated with the entity. As previously discussed, an entity desiring resource management may grant the user (i.e., the party in control or implementing the resource management module) access to data being transmitted from one or more of the inter-related devices associated with the entity. As such, the entity may provide the user with the identity of the one or more of the inter-related devices or the user may be tasked with determining which devices are associated with the user. In certain embodiments in which the entity and the user have a pre-existing relationship (i.e., such as in those embodiments in which the entity is a customer and the user is a financial institution), the user may have contacted the entity (e.g., website, call center, mobile application and the like) using various different communication devices (e.g., PC, laptop, mobile device and the like). Through proper authentication methods, such devices may become "trusted" devices in terms of their association with the entity. However, an entity may additionally have many other inter-related communication devices that are not used as normal means for communicating with the user (e.g., appliances, control units and the like). In order for the resource management module to receive data from such devices, either the devices have to be configured to send data to the user/resource management module or the resource management module has to be able to have the capability to recognize the presence of such devices and intercept or otherwise receive data transmissions from such devices. In this regard, if the user/resource management module has knowledge of the entity's gateway/router device and/or the short-range wireless network used to communicate with a gateway/router (IP address or the like included in data transmissions or the like), the user/resource management module may be configured to access the gateway/router to determine the data transmissions being routed through the gateway/router and, in some embodiments, intercept or reconfigure the data transmissions at the gateway to include the user/resource management module as a recipient of such data transmissions.

At Event 530, in response to determining that one or more of the inter-related communication devices are associated with the entity, at least a portion of the data being transmitted from such devices is received by the user/resource management module. In certain embodiments, the received data may be limited to identifying the device (in terms of the type of device, the brand, the model or the like). In specific embodiments of the invention, the identification of the devices may result in classifying the entity, for the sake of subsequent prediction of future resource need, based on the identification of the various devices they possess/own/control (e.g., more or higher value devices may equate to a higher entity classification). In other embodiments of the invention, the received data may include performance data, consumption data, procurement data and the like.

At Event 540, the received data is analyzed to predict future resource needs. In specific embodiments of the invention, the predicted future resource needs are predicted future financial resource needs, such as monetary funds that are predicted to be needed by the entity in the future. In alternate embodiments of the invention, in which the user and the entity have a pre-established relationship, other data may be additionally used in predicting future resource needs (e.g., in those embodiments in which the entity is a customer and the user is a business, the other data may include customer profile data, customer transaction history data and the like). In those embodiments in which the received data includes device identification data, the predicted future resource needs may be based on the identification of the devices or the classification/level assigned to the entity based on the identification of the devices. In other embodiments in which the data includes performance data, analyzing the data may include determining a current state of the device and/or a predicted useful remaining life of the device, such that determining the predicted future resource needs is based on the current state of the device(s) and/or the predicted useful remaining life of the device(s). In other embodiments in which the data includes consumption data, analyzing the data may include determining a time period for replacing the consumable sub-component/sub-device, such that determining the predicted future resource needs is based on the time period for replacing the consumable sub-component/device. In other embodiments in which the data includes procurement/transaction data, analyzing the data may include determining the identity of goods/services procured, the rate at which goods/services are procured and/or the cost of good/services procured, such that determining the predicted future resource needs is based on the identity of goods/services procured, the rate at which goods/services are procured and/or the cost of good/services procured.

At Event 550, a resource acquisition scheme is determined for the entity that accommodates the predicted future resource needs of the entity. In specific embodiments in which the resources are financial resources, the resource acquisition scheme may comprise one or more offers for financial products/services that serve to meet the predicted future financial resource needs of the entities. The financial products/services may include, but are not limited to, accounts, loans, mortgages or any other product or service that would serve to accommodate the predicted future financial resource needs of the entity. The offers may be specifically tailored for the entity based on the predicted future financial resource needs of the entity. For example, the terms, rates, amounts, lengths of the products/services may vary based on the predicted financial resource needs of the entity and any other relevant information related to the entity. Moreover, the timing of the offers may vary based on the timing related to the predicted future financial resource needs of the entity (i.e., time periods during which the entity is predicted to need the financial resources). In specific embodiments of the invention, in which one or more of receiving the data, analyzing the data to predict future financial needs and/or determining a resource acquisition scheme occur in real-time or near real-time, the resource acquisition schemes may be communicated to the entity in real-time or near real-time.

Thus, systems, apparatus, methods, and computer program products described above provide for predictive analysis of data received from inter-related communication devices, within a distributed communication network (e.g., Internet-of-Things (IoT)), which are determined to be associated with an entity. The predictive analysis resulting in a determination of future resource needs. Based on the predicted future resource needs, the present invention determines a resource acquisition scheme which serves to accommodate the predicted future resource needs.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for predictive analysis for resource management comprising:
   a computer platform including, a memory, a processor in communication with the memory and a network communication device in communication with the processor; and
   a resource management module stored in the memory, executable by the processor, and configured for:
   identifying at least one gateway device or at least one router associated with an entity by receiving first electronic communication from the entity via the at least one gateway device or the at least one router, wherein the gateway device or router is identified by an Internet Protocol address associated with the first electronic communication,
   identifying at least one short-range wireless network associated with the entity by receiving second electronic communication from the entity via the short-range wireless network, wherein the short-range wireless network is identified by a subnet mask identification number associated with the second electronic communication,
   in response to identifying (i) the at least one gateway device or the at least one router, and (ii) the at least one short-range wireless network periodically pinging the at least one gateway device or the at least one router using the IP address, and the at least one short-range wireless network using the subnet mask identification number, to (a) identify inter-related communication devices associated with the entity that are transmitting data via the (i) the at least one gateway device or the at least one router, and (ii) the at least one short-range wireless network, and (b) receive at least a portion of the data transmitted by the inter-related communication devices, wherein the data is captured by at least one sensor embedded in one of the inter-related communication devices,
   analyzing the at least a portion of the data to predict future entity resource needs, and
   determining a resource acquisition scheme that accommodates the future entity resource needs.

2. The system of claim 1, wherein the resource management module is further configured for:
   receiving the at least a portion of the data transmitted by the inter-related communication devices, wherein the at least a portion of the data identifies the inter-related communication devices.

3. The system of claim 2, wherein the resource management module is further configured for:
   analyzing the at least a portion of the data to predict future entity resource needs based on identity of the inter-related communication devices.

4. The system of claim 2, wherein the resource management module is further configured for:
   analyzing the at least a portion of the data to determine an entity level based on identity of the inter-related communication devices, and based on the entity level, predict the future entity resource needs.

5. The system of claim 1, wherein the resource management module is further configured for:
   receiving the at least a portion of the data transmitted by the inter-related communication devices, wherein the at least a portion of the data includes performance data associated with the plurality of devices,
   analyzing the at least a portion of the data to determine at least one of (i) a current state of at least one of the inter-related communication devices, and (ii) a predicted life of at least one of the inter-related communication devices, and
   based on at least one of the current state of the at least one of the inter-related communication devices and the predicted life of the at least one of the inter-related communication devices, determining the resource acquisition scheme for the future entity resource needs.

6. The system of claim 1, wherein the resource management module is further configured for:
   receiving the at least a portion of the data transmitted by the inter-related communication devices, wherein the at least a portion of the data includes consumption data associated with consumable sub-devices associated with one or more of the inter-related communication devices, and
   analyzing the consumption data to predict future entity resource needs.

7. The system of claim 1, wherein the resource management module is further configured for:
   receiving the at least a portion of the data transmitted by the inter-related communication devices, wherein the at least a portion of the data includes procurement data associated with items or services procured via the one or more of the inter-related communication devices, and analyzing the procurement data to predict future entity resource needs.

8. The system of claim 1, wherein the resource management module is further configured for:

based on the future entity resource needs, determining, in real-time, the resource acquisition scheme for the future entity resource needs, and in response to determining the resource acquisition scheme, communicating the resource acquisition scheme to the entity.

9. The system of claim 1, wherein the resource management module is further configured for:

analyzing the at least a portion of the data to predict future entity resource needs, wherein the future entity resource needs are further defined as financial resources needed by the entity in the future.

10. The system of claim 9, wherein the resource management module is further configured for:

based on the future entity resource needs, determining the resource acquisition scheme that accommodates the future entity resource needs, wherein the resource acquisition scheme is further defined as offers for financial products that serve to accommodate the financial resources needed by the entity in the future.

11. A method for predictive analysis for resource management, the method comprising:

identifying, by a computing device processor, at least one gateway device or at least one router associated with an entity by receiving first electronic communication from the entity via the at least one gateway device or the at least one router, wherein the gateway device or router is identified by an Internet Protocol address associated with the first electronic communication;

identifying, by a computing device processor, at least one short-range wireless network associated with the entity by receiving second electronic communication from the entity via the short-range wireless network, wherein the short-range wireless network is identified by a subnet mask identification number associated with the second electronic communication;

in response to identifying (i) the at least one gateway device or the at least one router, and (ii) the at least one short-range wireless network periodically pinging, by a computing device processor, the at least one gateway device or the at least one router using the IP address, and the at least one short-range wireless network using the subnet mask identification number, to (a) identify inter-related communication devices associated with the entity that are transmitting data via the (i) the at least one gateway device or the at least one router, and (ii) the at least one short-range wireless network, and (b) receive at least a portion of the data transmitted by the inter-related communication devices, wherein the data is captured by at least one sensor embedded in one of the inter-related communication devices;

analyzing, by a computing device processor, the at least a portion of the data to predict future entity resource needs; and determining, by a computing device processor, a resource acquisition scheme that accommodates the future entity resource needs.

12. The method of claim 11, wherein receiving the at least a portion of the data further comprises receiving, by the computing device processor, the at least a portion of the data transmitted by the inter-related communication devices, wherein the data identifies the inter-related communication devices, and wherein analyzing the at least a portion of the data further comprises analyzing, by the computing device processor, the at least a portion of the data to predict future entity resource needs based on identity of the inter-related communication devices.

13. The method of claim 12, wherein analyzing the at least a portion of the data further comprises analyzing, by the computing device processor, the at least a portion of the data to determine an entity level based on identity of the inter-related communication devices, and based on the entity level, predict the future entity resource needs.

14. The method of claim 11, wherein determining the resource acquisition scheme further comprises, based on the future entity resource needs, determining, in real-time, the resource acquisition scheme that accommodates the future entity resource needs, and the method further comprises, in response to determining the resource acquisition scheme, communicating the resource acquisition scheme to the entity.

15. The method of claim 11, wherein analyzing the at least a portion of the data further comprises analyzing, by the computing device processor, the at least a portion of the data to predict future entity resource needs, wherein the future entity resource needs are further defined as financial resources needed by the entity in the future.

16. The method of claim 15, wherein determining the resource acquisition scheme further comprises determining, by the computing device processor, the resource acquisition scheme that accommodates the future entity resource needs, wherein the resource acquisition scheme is further defined as offers for financial products that serve to accommodate the financial resources needed by the entity in the future.

17. A computer program product for predictive analysis for resource management comprising a non-transitory computer-readable storage medium having computer-executable instructions for:

identifying at least one gateway device or at least one router associated with an entity by receiving first electronic communication from the entity via the at least one gateway device or the at least one router, wherein the gateway device or router is identified by an Internet Protocol address associated with the first electronic communication;

identifying at least one short-range wireless network associated with the entity by receiving second electronic communication from the entity via the short-range wireless network, wherein the short-range wireless network is identified by a subnet mask identification number associated with the second electronic communication;

in response to identifying (i) the at least one gateway device or the at least one router, and (ii) the at least one short-range wireless network periodically pinging the at least one gateway device or the at least one router using the IP address, and the at least one short-range wireless network using the subnet mask identification number, to (a) identify inter-related communication devices associated with the entity that are transmitting data via the (i) the at least one gateway device or the at least one router, and (ii) the at least one short-range wireless network, and (b) receive at least a portion of the data transmitted by the inter-related communication devices, wherein the data is captured by at least one sensor embedded in one of the inter-related communication devices;

analyzing the at least a portion of the data to predict future entity resource needs; and determining a resource acquisition scheme that accommodates the future entity resource needs.

18. The computer program product of claim 17, wherein the instructions for receiving the at least a portion of the data further comprise instructions for receiving the at least a portion of the data transmitted inter-related communication devices, wherein the data identifies the one or more of the plurality of devices, and wherein the instructions for analyzing the at least a portion of the data further comprise instructions for analyzing the at least a portion of the data to predict future entity resource needs based on identity of the inter-related communication devices.

19. The computer program product of claim 18, wherein the instructions for analyzing the at least a portion of the data further comprise instructions for analyzing the at least a portion of the data to determine an entity level based on identity of the one or more of the plurality of inter-related communication devices, and based on the entity level, predict the future entity resource needs.

20. The computer program product of claim 17, wherein instructions for analyzing the at least a portion of the data further comprise instructions for analyzing the at least a portion of the data to predict financial resources needed by the entity in the future, and wherein the instructions for determining the resource acquisition scheme further comprise instructions for determining the offers for financial products that serve to accommodate the financial resources needed by the entity in the future.

* * * * *